(12) United States Patent
Zhang et al.

(10) Patent No.: US 9,264,962 B2
(45) Date of Patent: Feb. 16, 2016

(54) APPARATUS AND METHODS FOR DETECTING AND HANDLING SPURIOUS DEDICATED PHYSICAL CONTROL CHANNEL IN SOFT HANDOVER

(71) Applicant: QUALCOMM Incorporated, San Diego, CA (US)

(72) Inventors: Wei Zhang, Santa Clara, CA (US); Sagar Bharatkumar Shah, San Diego, CA (US); Rami Hmeidan Alnatsheh, San Diego, CA (US); Vijay Marwah, San Diego, CA (US); Nate Chizgi, Sunnyvale, CA (US); Guang Xie, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 49 days.

(21) Appl. No.: 14/265,063

(22) Filed: Apr. 29, 2014

(65) Prior Publication Data

US 2015/0117402 A1    Apr. 30, 2015

Related U.S. Application Data

(60) Provisional application No. 61/897,168, filed on Oct. 29, 2013.

(51) Int. Cl.
*H04B 7/00* (2006.01)
*H04W 36/18* (2009.01)
*H04W 24/02* (2009.01)

(52) U.S. Cl.
CPC .............. *H04W 36/18* (2013.01); *H04W 24/02* (2013.01)

(58) Field of Classification Search
CPC .. H04W 36/0016; H04W 52/54; H04W 52/40
USPC .......................... 370/310, 328, 329, 332, 349
See application file for complete search history.

(56) References Cited

U.S. PATENT DOCUMENTS 5,239,682 A * 8/1993 Strawcynski et al. ......... 455/436
7,079,848 B2 * 7/2006 Das et al. .................... 455/452.2
(Continued)

FOREIGN PATENT DOCUMENTS

WO    WO-2009143296 A1    11/2009

OTHER PUBLICATIONS

3GPP Draft; R1-99279, 3rd Generation Partnership Project (3GPP), Mobile Competence Centre, 650, Route Des Lucioles; F-06921 Sophia-Anti Polis Cedex; France; vol. RAN WG1. No. NynA shamn; Apr. 2, 1999, XP050088429, pp. 1-33, [retrieved on Apr. 2, 1999] section 5.2.3.4 Site selection diversity transmit power control.

(Continued)

*Primary Examiner* — Dmitry H Levitan
(74) *Attorney, Agent, or Firm* — Loza & Loza LLP

(57) ABSTRACT

Aspects of the present disclosure provide an apparatus and methods for detecting and handling a spurious Dedicated Physical Channel (DPCH) of a cell in an active set from a mobile station side. A user equipment determines a signal-to-interference ratio (SIR) for each channel of a plurality of channels associated with cells maintained in an active set. A spurious DPCH has the lowest SIR among the plurality of channels. The user equipment puts the detected spurious DPCH in an exclusion mode in which the spurious DPCH is excluded from at least one of channel decoding or SIRE calculation, while maintaining the cell associated with the spurious DPCH in the active set.

28 Claims, 10 Drawing Sheets

(56) References Cited

U.S. PATENT DOCUMENTS

| | | | |
|---|---|---|---|
| 7,805,155 B2 * | 9/2010 | Chapman et al. | 455/525 |
| 7,853,284 B2 * | 12/2010 | Iwanaga et al. | 455/522 |
| 8,249,179 B2 * | 8/2012 | Onodera et al. | 375/260 |
| 8,306,549 B2 * | 11/2012 | Wang et al. | 455/452.2 |
| 2013/0094378 A1 | 4/2013 | Landau et al. | |
| 2013/0137440 A1 | 5/2013 | Clevorn | |
| 2013/0242868 A1 | 9/2013 | Kostic et al. | |
| 2013/0324179 A1 | 12/2013 | Zhang et al. | |
| 2014/0023046 A1 | 1/2014 | Ma et al. | |

OTHER PUBLICATIONS

International Search Report and Written Opinion—PCT/US2014/061980—ISA/EPO—Mar. 27, 2014 (140038WO).

* cited by examiner

APPARATUS AND METHODS FOR DETECTING AND HANDLING SPURIOUS DEDICATED PHYSICAL CONTROL CHANNEL IN SOFT HANDOVER

CROSS-REFERENCE TO RELATED APPLICATIONS

This application claims priority to and the benefit of provisional patent application No. 61/897,168 filed in the United States Patent and Trademark Office on 29 Oct. 2013, the entire content of which is incorporated herein by reference.

TECHNICAL FIELD

Aspects of the present disclosure relate generally to wireless communication systems, and more particularly, to problematic channels handling in wireless communication.

BACKGROUND

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). UMTS also supports enhanced 3G data communications protocols, such as High Speed Packet Access (HSPA), which provides higher data transfer speeds and capacity to associated UMTS networks.

In soft handover, radio links (e.g., for the Dedicated Physical Channel (DPCH)) are added and removed in a way that a mobile station always keeps at least one radio link to the UTRAN. Soft handover is generally performed by means of macro diversity, which refers to the condition that several radio links are active at the same time. In a UMTS network, soft handover can be used when cells operated on the same frequency are changed. During soft handover, a mobile station is in the overlapping cell coverage area of two sectors or cells belonging to different base stations. Therefore, the communication between the mobile station and the base stations takes place concurrently via two air interface channels from each base station separately.

As the demand for mobile broadband access continues to increase, research and development continue to advance the UMTS technologies not only to meet the growing demand for mobile broadband access, but to advance and enhance the user experience with mobile communications.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the present disclosure provide an apparatus and methods for detecting and handling a spurious Dedicated Physical Channel (DPCH) of a cell in an active set from a mobile station side. A user equipment determines a signal-to-interference ratio (SIR) for each channel of a plurality of channels of the cells maintained in an active set. A spurious DPCH has the lowest SIR among the plurality of channels. The user equipment puts the detected spurious DPCH in an exclusion mode in which the spurious DPCH is excluded from at least one of channel decoding or SIRE calculation, while maintaining the cell of the spurious DPCH in the active set.

One aspect of the disclosure provides a method of wireless communication operable at a user equipment. The method determines a signal-to-interference ratio (SIR) for each channel of a plurality of channels associated with a plurality of cells maintained in an active set. The method further detects a first channel of the plurality of channels, wherein the SIR of the first channel is a lowest SIR among the plurality of channels. The method further puts the detected first channel in an exclusion mode in which the first channel is excluded from at least one of channel decoding or SIR calculation of the plurality of channels, while maintaining the cell associated with the first channel in the active set.

Another aspect of the disclosure provides an apparatus for wireless communication. The apparatus includes means for determining a signal-to-interference ratio (SIR) for each channel of a plurality of channels associated with a plurality of cells maintained in an active set. The apparatus further includes means for detecting a first channel of the plurality of channels, wherein the SIR of the first channel is a lowest SIR among the plurality of channels. The apparatus further includes means for putting the detected first channel in an exclusion mode in which the first channel is excluded from at least one of channel decoding or SIR calculation of the plurality of channels, while maintaining the cell associated with the first channel in the active set.

Another aspect of the disclosure provides a computer-readable storage medium comprising code for causing a user equipment to: determine a signal-to-interference ratio (SIR) for each channel of a plurality of channels associated with a plurality of cells maintained in an active set; detect a first channel of the plurality of channels, wherein the SIR of the first channel is a lowest SIR among the plurality of channels; and putting the detected first channel in an exclusion mode in which the first channel is excluded from at least one of channel decoding or SIR calculation of the plurality of channels, while maintaining the cell associated with the first channel in the active set.

Another aspect of the disclosure provides an apparatus for wireless communication. The apparatus includes at least one processor, a communication interface coupled to the at least one processor, and a memory coupled to the at least one processor. The at least one processor includes a first component, a second component, and a third component. The first component is configured to determine a signal-to-interference ratio (SIR) for each channel of a plurality of channels associated with a plurality of cells maintained in an active set. The second component is configured to detect a first channel of the plurality of channels, wherein the SIR of the first channel is a lowest SIR among the plurality of channels. The third component is configured to put the detected first channel in an exclusion mode in which the first channel is excluded from at least one of channel decoding or SIR calculation of the plurality of channels, while maintaining the cell associated with the first channel in the active set.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Aspects of the present disclosure provide an approach to detect and handle a spurious Dedicated Physical Channel (DPCH) of a cell in an active set from a user equipment or mobile station side in a soft handover case. However, this disclosure also has applications in other scenarios for dealing with a problematic DPCH of a cell maintained in an active set for various reasons, for example, when a mobile station is getting a weak signal from certain cells due to obstacles between the mobile station and a base station.

Figure 1:
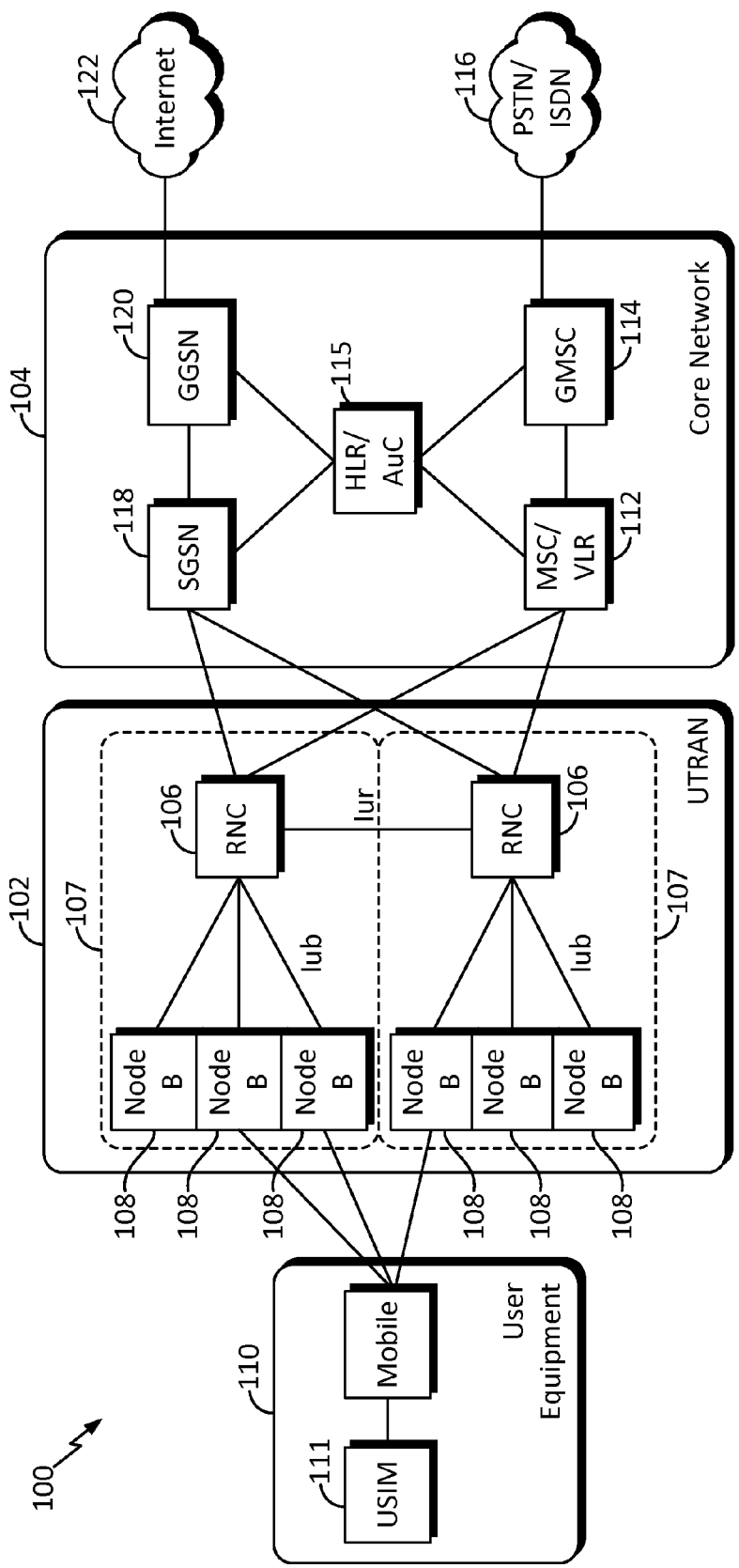
FIG. 1 is a block diagram conceptually illustrating an example of a Universal Mobile Telecommunications System (UMTS) telecommunications system.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a Universal Mobile Telecommunications System (UMTS) system 100. A UMTS network includes three interacting domains: a core network 104, a radio access network (RAN) (e.g., the UMTS Terrestrial Radio Access Network (UTRAN) 102), and a user equipment (UE) 110. Among several options available for a UTRAN 102, in this example, the illustrated UTRAN 102 may employ a W-CDMA air interface for enabling various wireless services including telephony, video, data, messaging, broadcasts, and/or other services. The UTRAN 102 may include a plurality of Radio Network Subsystems (RNSs) such as an RNS 107, each controlled by a respective Radio Network Controller (RNC) such as an RNC 106. Here, the UTRAN 102 may include any number of RNCs 106 and RNSs 107 in addition to the illustrated RNCs 106 and RNSs 107. The RNC 106 is an apparatus responsible for, among other things, assigning, reconfiguring, and releasing radio resources within the RNS 107. The RNC 106 may be interconnected to other RNCs (not shown) in the UTRAN 102 through various types of interfaces such as a direct physical connection, a virtual network, or the like using any suitable transport network.

The geographic region covered by the RNS 107 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 108 are shown in each RNS 107; however, the RNSs 107 may include any number of wireless Node Bs. The Node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, a tablet, a wearable computing device (e.g., a smartwatch, a health or fitness tracker, etc.), an appliance, a sensor, a vending machine, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 110 may further include a universal subscriber identity module (USIM) 111, which contains a user's subscription information to a network. For illustrative purposes, one UE 110 is shown in communication with a number of the Node Bs 108. The downlink (DL), also called the forward link, refers to the communication link from a Node B 108 to a UE 110 and the uplink (UL), also called the reverse link, refers to the communication link from a UE 110 to a Node B 108.

The core network 104 can interface with one or more access networks, such as the UTRAN 102. As shown, the core network 104 is a UMTS core network. However, as those skilled in the art will recognize, the various concepts presented throughout this disclosure may be implemented in a RAN, or other suitable access network, to provide UEs with access to types of core networks other than UMTS networks.

The illustrated UMTS core network 104 includes a circuit-switched (CS) domain and a packet-switched (PS) domain. Some of the circuit-switched elements are a Mobile services Switching Centre (MSC), a Visitor Location Register (VLR), and a Gateway MSC (GMSC). Packet-switched elements include a Serving GPRS Support Node (SGSN) and a Gateway GPRS Support Node (GGSN). Some network elements, like EIR, HLR, VLR, and AuC may be shared by both of the circuit-switched and packet-switched domains.

In the illustrated example, the core network 104 supports circuit-switched services with a MSC 112 and a GMSC 114. In some applications, the GMSC 114 may be referred to as a media gateway (MGW). One or more RNCs, such as the RNC 106, may be connected to the MSC 112. The MSC 112 is an apparatus that controls call setup, call routing, and UE mobility functions. The MSC 112 also includes a visitor location register (VLR) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) 115 containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR 115 to determine the UE's location and forwards the call to the particular MSC serving that location.

The illustrated core network 104 also supports packet-switched data services with a serving GPRS support node (SGSN) 118 and a gateway GPRS support node (GGSN) 120. General Packet Radio Service (GPRS) is designed to provide packet-data services at speeds higher than those available with standard circuit-switched data services. The GGSN 120 provides a connection for the UTRAN 102 to a packet-based network 122. The packet-based network 122 may be the Internet, a private data network, or some other suitable packet-based network. The primary function of the GGSN 120 is to provide the UEs 110 with packet-based network connectivity. Data packets may be transferred between the GGSN 120 and the UEs 110 through the SGSN 118, which performs primarily the same functions in the packet-based domain as the MSC 112 performs in the circuit-switched domain.

Figure 2:
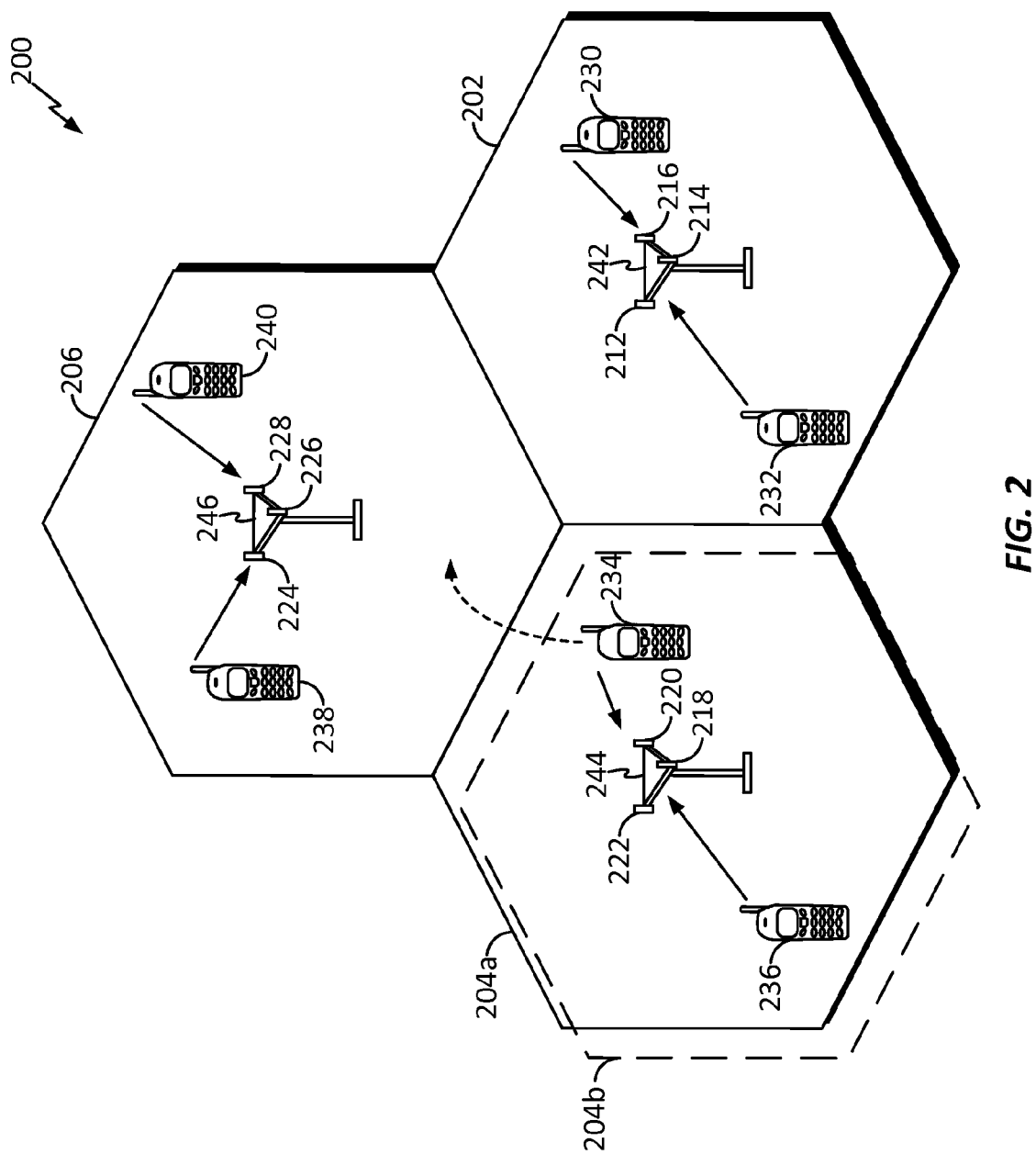
FIG. 2 is a conceptual diagram illustrating an example of a radio access network.

The UTRAN 102 is one example of a RAN that may be utilized in accordance with the present disclosure. Referring to FIG. 2, by way of example and without limitation, a simplified schematic illustration of a RAN 200 in a UTRAN architecture is illustrated. The RAN 200 may be the UTRAN 102. The system includes multiple cellular regions (cells), including cells 202, 204, and 206, each of which may include one or more sectors. Cells may be defined geographically (e.g., by coverage area) and/or may be defined in accordance with a frequency, scrambling code, etc. That is, the illustrated geographically-defined cells 202, 204, and 206 may each be further divided into a plurality of cells, e.g., by utilizing different scrambling codes. For example, cell 204a may utilize a first scrambling code, and cell 204b, while in the same geographic region and served by the same Node B 244, may be distinguished by utilizing a second scrambling code.

In a cell that is divided into sectors, the multiple sectors within a cell can be formed by groups of antennas with each antenna responsible for communication with UEs in a portion of the cell. For example, in cell 202, antenna groups 212, 214, and 216 may each correspond to a different sector. In cell 204, antenna groups 218, 220, and 222 may each correspond to a different sector. In cell 206, antenna groups 224, 226, and 228 may each correspond to a different sector.

The cells 202, 204, and 206 may include several UEs that may be in communication with one or more sectors of each cell 202, 204, or 206. For example, UEs 230 and 232 may be in communication with Node B 242, UEs 234 and 236 may be in communication with Node B 244, and UEs 238 and 240 may be in communication with Node B 246. Here, each Node B 242, 244, and 246 may be configured to provide an access point to a core network 204 (see FIG. 2) for all the UEs 230, 232, 234, 236, 238, and 240 in the respective cells 202, 204, and 206.

During a call with a source cell, or at any other time, the UE 236 may monitor various parameters of the source cell as well as various parameters of neighboring cells. Further, depending on the quality of these parameters, the UE 236 may maintain communication with one or more of the neighboring cells. During this time, the UE 236 may maintain an active set (Aset), that is, a list of cells to which the UE 236 is simultaneously connected (i.e., the UTRAN cells that are currently assigning a downlink DPCH or fractional downlink dedicated physical channel (F-DPCH) to the UE 236 may constitute the Aset). The active set may also include the primary scrambling code (PSC) associated with each DPCH/F-DPCH. Hereafter, when reference is made to a cell, it may refer to a cell, a sector of a cell, and/or a base station (e.g., Node B) of a cell.

In soft handover, whenever certain sectors are added to an active set by the network, there may be an impact to the UE's decoding performance as well as overall signal-to-interference ratio estimate (SIRE) (i.e., the SIRE for each DPCH assigned to the UE). Furthermore, depending on how strong the rest of the sectors are, the cyclic redundancy check (CRC) error ratio of the UE could increase to an undesirable level (e.g., 100%) after a bad sector is added to the Aset. The SIRE on the other hand can also decrease to a undesirably low value and possibly lead to the UE reporting that it is in an out of sync (OOS) state, because the noise of a spurious DPCH from the bad sector can dominate the overall SIRE. In various aspects of the disclosure, a signal-to-interference ratio (SIR) may include the SIRE as an example and the calculation process of determining the SIRE.

The UTRAN air interface may be a spread spectrum Direct-Sequence Code Division Multiple Access (DS-CDMA) system, such as one utilizing the W-CDMA standards. The spread spectrum DS-CDMA spreads user data through multiplication by a sequence of pseudorandom bits called chips. The W-CDMA air interface for the UTRAN 102 is based on such DS-CDMA technology and additionally calls for a frequency division duplexing (FDD). FDD uses a different carrier frequency for the uplink (UL) and downlink (DL) between a Node B 108 and a UE 110. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles are equally applicable to a TD-SCDMA air interface or any other suitable air interface.

In a wireless telecommunication system, the communication protocol architecture may take on various forms depending on the particular application. For example, in a 3GPP UMTS system, the signaling protocol stack is divided into a Non-Access Stratum (NAS) and an Access Stratum (AS). The NAS provides the upper layers, for signaling between the UE 110 and the core network 104 (referring to FIG. 1), and may include circuit switched and packet switched protocols. The AS provides the lower layers, for signaling between the UTRAN 102 and the UE 110, and may include a user plane and a control plane. Here, the user plane or data plane carries user traffic, while the control plane carries control information (i.e., signaling).

Figure 3:
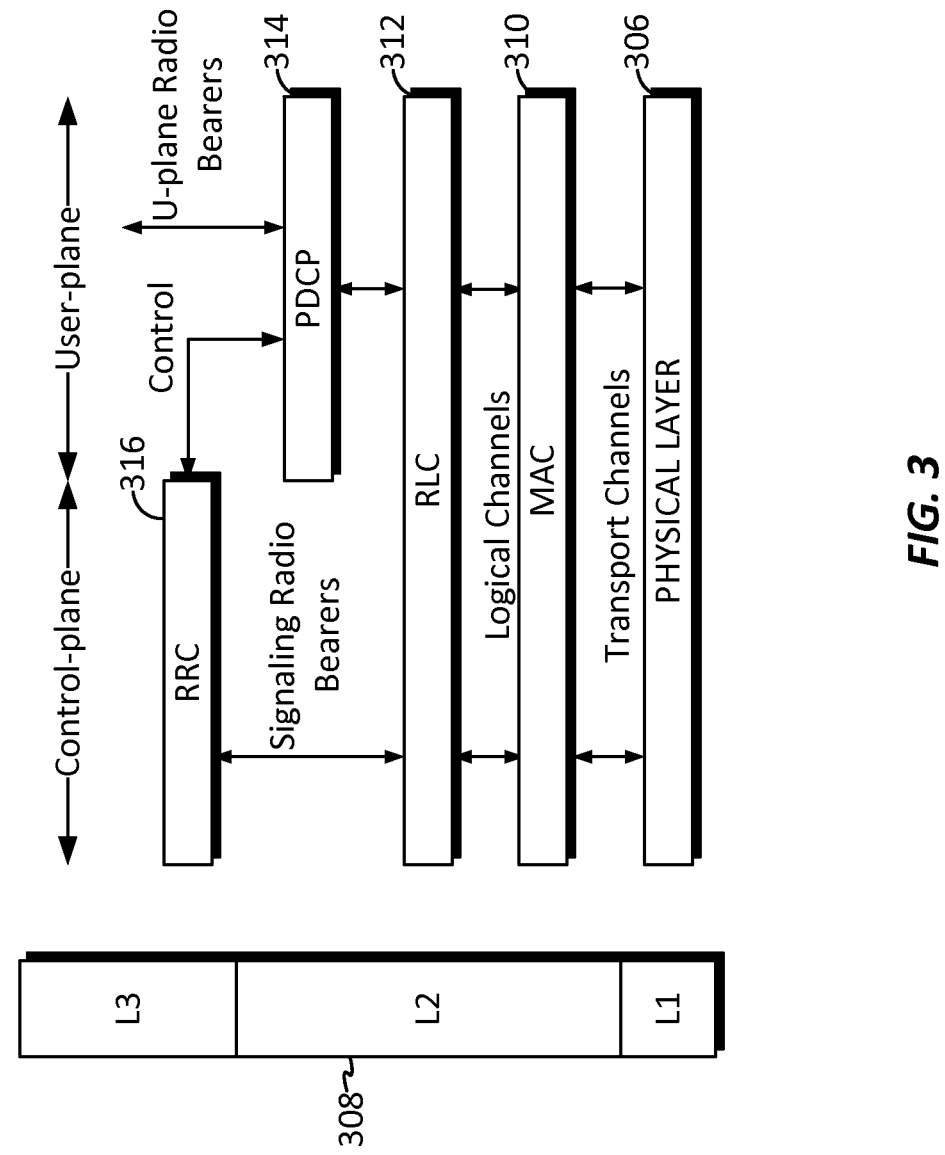
FIG. 3 is a conceptual diagram illustrating an example of a radio protocol architecture for the user and control plane in the UMTS standards.

Turning to FIG. 3, the AS is shown with three layers: Layer 1, Layer 2, and Layer 3. Layer 1 is the lowest layer and implements various physical layer signal processing functions. Layer 1 will be referred to herein as the physical layer 306. The data link layer, called Layer 2 308, is above the physical layer 306 and is responsible for the link between the UE 110 and Node B 108 over the physical layer 306.

At Layer 3, the RRC layer 316 handles the control plane signaling between the UE 110 and the Node B 108. RRC layer 316 includes a number of functional entities for routing higher layer messages, handling broadcasting and paging functions, establishing and configuring radio bearers, etc.

In the illustrated air interface, the L2 layer 308 is split into sublayers. In the control plane, the L2 layer 308 includes two sublayers: a medium access control (MAC) sublayer 310 and a radio link control (RLC) sublayer 312. In the user plane, the L2 layer 308 additionally includes a packet data convergence protocol (PDCP) sublayer 314. Although not shown, the UE may have several upper layers above the L2 layer 308 including a network layer (e.g., IP layer) that is terminated at a PDN gateway on the network side and an application layer that is terminated at the other end of the connection (e.g., far end UE, server, etc.).

The PDCP sublayer 314 provides multiplexing between different radio bearers and logical channels. The PDCP sublayer 314 also provides header compression for upper layer data packets to reduce radio transmission overhead, security by ciphering the data packets, and handover support for UEs between Node Bs.

The RLC sublayer 312 generally supports an acknowledged mode (AM) (where an acknowledgment and retransmission process may be used for error correction), an unacknowledged mode (UM), and a transparent mode for data transfers, and provides segmentation and reassembly of upper layer data packets and reordering of data packets to compensate for out-of-order reception due to a hybrid automatic repeat request (HARQ) at the MAC layer. In the acknowledged mode, RLC peer entities such as an RNC and a UE may exchange various RLC protocol data units (PDUs) including RLC Data PDUs, RLC Status PDUs, and RLC Reset PDUs, among others. In the present disclosure, the term "packet" may refer to any RLC PDU exchanged between RLC peer entities.

The MAC sublayer 310 provides multiplexing between logical and transport channels. The MAC sublayer 310 is also responsible for allocating the various radio resources (e.g., resource blocks) in one cell among the UEs. The MAC sublayer 310 is also responsible for HARQ operations. The MAC sublayer 310 includes various MAC entities, including but not limited to a MAC-d entity and MAC-hs/ehs entity. The Radio Network Controller (RNC) houses protocol layers from MAC-d and above. For the high speed channels, the MAC-hs/ehs layer is housed in the Node B.

From the UE side, the MAC-d entity is configured to control access to all the dedicated transport channels, to a MAC-c/sh/m entity, and to the MAC-hs/ehs entity. Further, from the UE side, the MAC-hs/ehs entity is configured to handle the HSDPA specific functions and control access to the HS-DSCH transport channel. Upper layers configure which of the two entities, MAC-hs or MAC-ehs, is to be applied to handle HS-DSCH functionality.

Hereafter, in accordance with aspects of the present disclosure, a two-step approach is described that can detect and handle a spurious DPCH of a cell in an active set. The spurious DPCH refers to a DPCH channel that may undesirably impact a UE's decoding performance as well as signal-to-interference ratio estimate (SIRE). For example, a spurious DPCH may affect the CRC error ratio and dominate the overall SIRE calculation for the active set. Therefore, a spurious DPCH can negatively affect decoding performance as well as the overall SIRE. In another example, if a spurious DPCH is not detected or recognized by the UE, then this spurious DPCH may end up as the only cell in the Aset, which will result in call drop. Another example is that the spurious DPCH may cause the UE to use more power than necessary due to the uncertainty on down link quality estimate. On the other hand, with spurious DPCH, uplink transmit power control (TPC) decoding on that cell may not be consistent. Thus, it may also impact the network because the UE may transmit at higher power due to uplink TPC errors.

Figure 4:
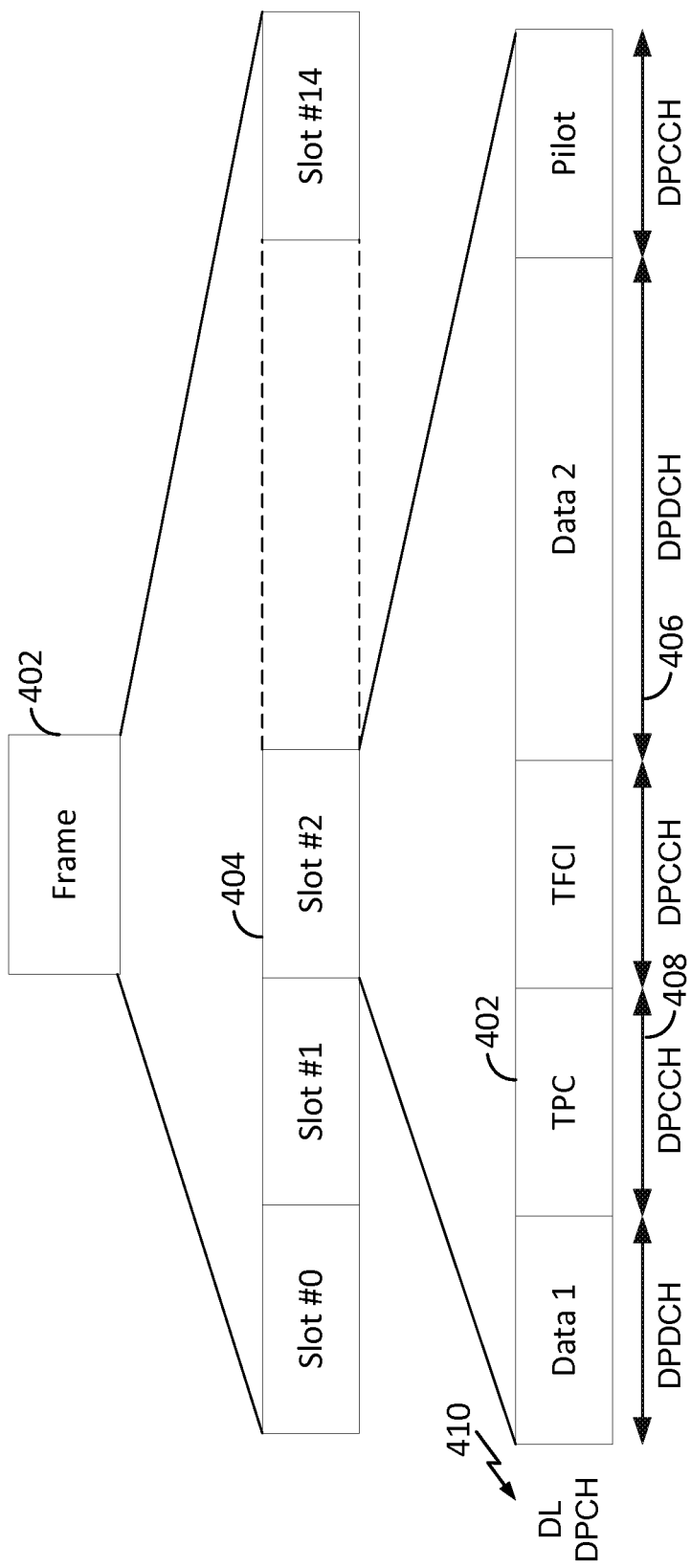
FIG. 4 is a conceptual diagram illustrating a dedicated physical data channel (DPDCH) and a dedicated physical control channel (DPCCH) time-multiplexed onto a downlink Dedicated Physical Channel (DPCH).

Referring to FIG. 4, in UMTS, one frame 402 is divided into fifteen slots 404 (slot #0 through slot #14). A dedicated physical data channel (DPDCH) 406 and a dedicated physical control channel (DPCCH) 408 are time-multiplexed onto a downlink (DL) DPCH 410 in one slot 404. In various aspects of the present disclosure, a spurious DPCH can be handled based on the per-cell SIRE determined for each DPCH in the active set. In an aspect of the disclosure, for each frame or a certain number of frames, a UE calculates the SIRE for each DPCH and ranks them. In some examples, for every M frames (e.g., M is equal to or less than 4), the UE may calculate the SIRE for each DPCH and ranks them. The UE checks two conditions to see whether the DPCH with the lowest SIRE is a spurious DPCH (cell) or not. The two conditions will be described below in more detail in reference to FIGS. 5-7 below.

Figure 5:
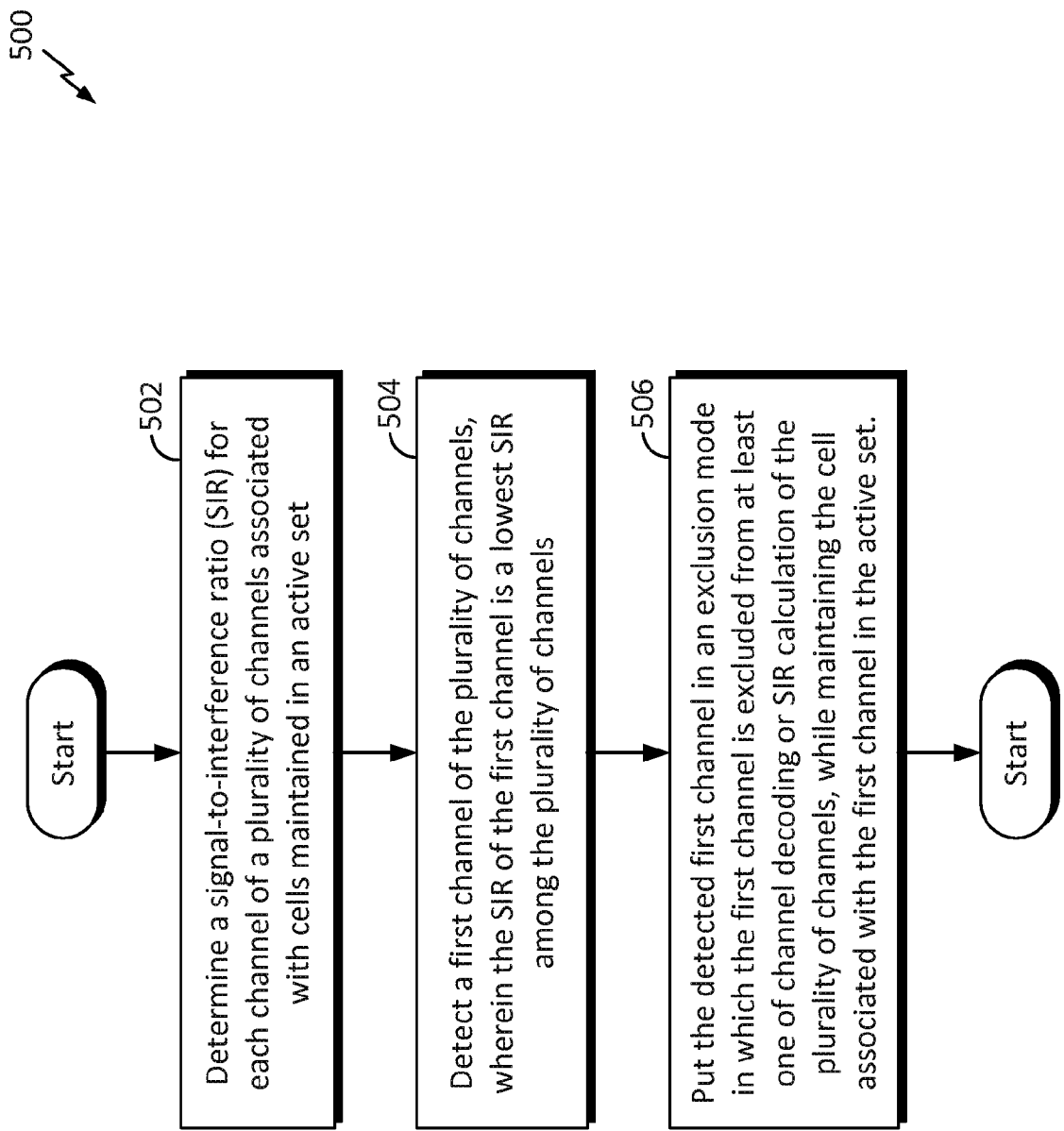
FIG. 5 is a flowchart illustrating a procedure for detecting a spurious DPCH of a cell in an active set in accordance with an aspect of the disclosure.

FIG. 5 is a flowchart illustrating a procedure 500 for handling a spurious DPCH of a cell in an active set in accordance with an aspect of the disclosure. The procedure 500 may be performed by any of the UEs illustrated in FIGS. 1 and 2, which may be implemented as an apparatus 800 illustrated in FIGS. 8 and 9. In other aspects of the disclosure, the procedure 500 may be performed by any suitable device or UE. Throughout this specification, when a DPCH is described to be included or maintained in an active set, it means that the DPCH's associated cell, sector, or Node B is included in the active set.

Figure 10:
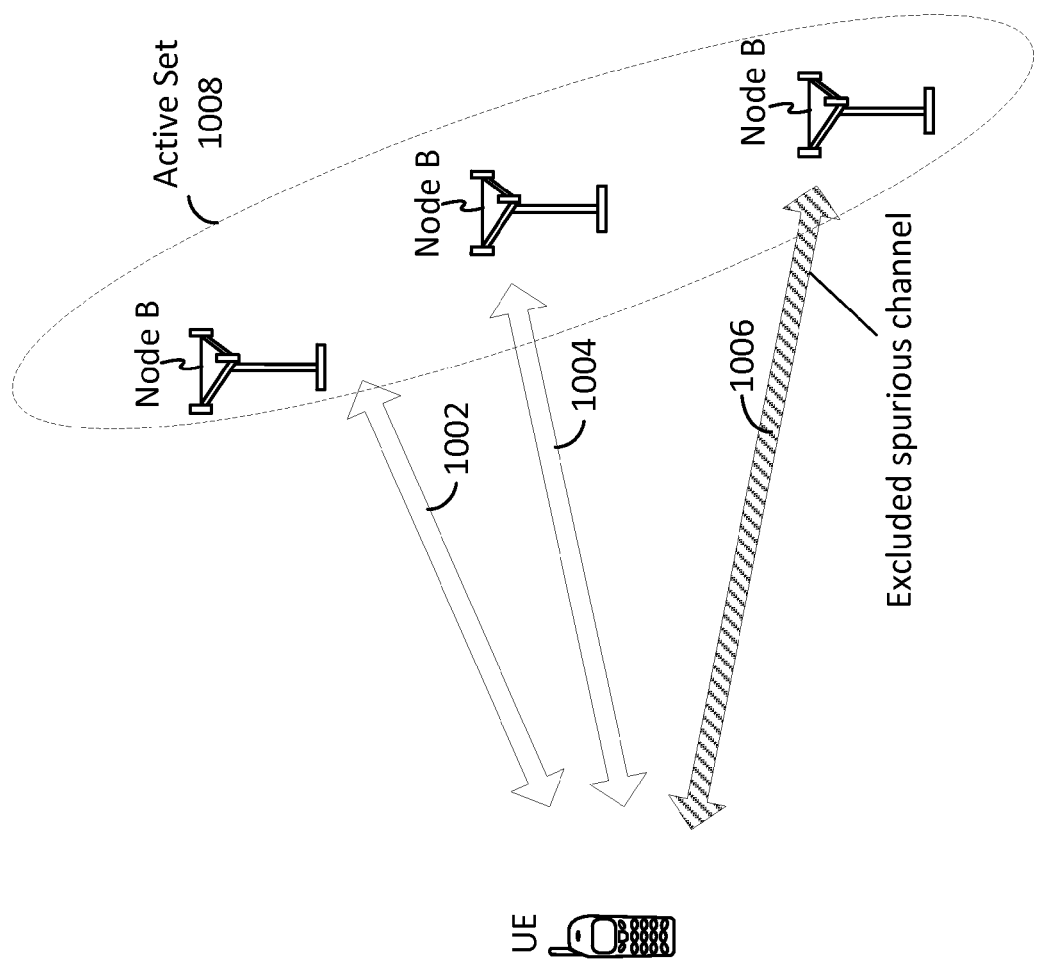
FIG. 10 is a diagram illustrating a number of DPCHs including a spurious DPCH of cells in an active set in accordance with an aspect of the disclosure.

At block 502, a UE determines a signal-to-interference ratio (SIR) for each channel of a plurality of channels associated with cells maintained in an active set. By way of example and not limitation, the SIR may be an SIRE, and the channels may be DPCHs 1002, 1004 and 1006 of the cells (Node B) in an active set 1008 as illustrated in FIG. 10. At block 504, the UE detects a first channel that has the lowest SIR among the plurality of channels. For example, the first channel may be a spurious DPCH 1006. At block 506, the UE puts the detected first channel in an exclusion mode in which the first channel is excluded from at least one of channel decoding or SIR calculation of the plurality of channels, while maintaining the cell associated with the first channel in the active set. That is, the cell of the DPCH with the lowest SIR remains in the active set, but this DPCH is not used in channel decoding or SIR calculation.

Figure 6:
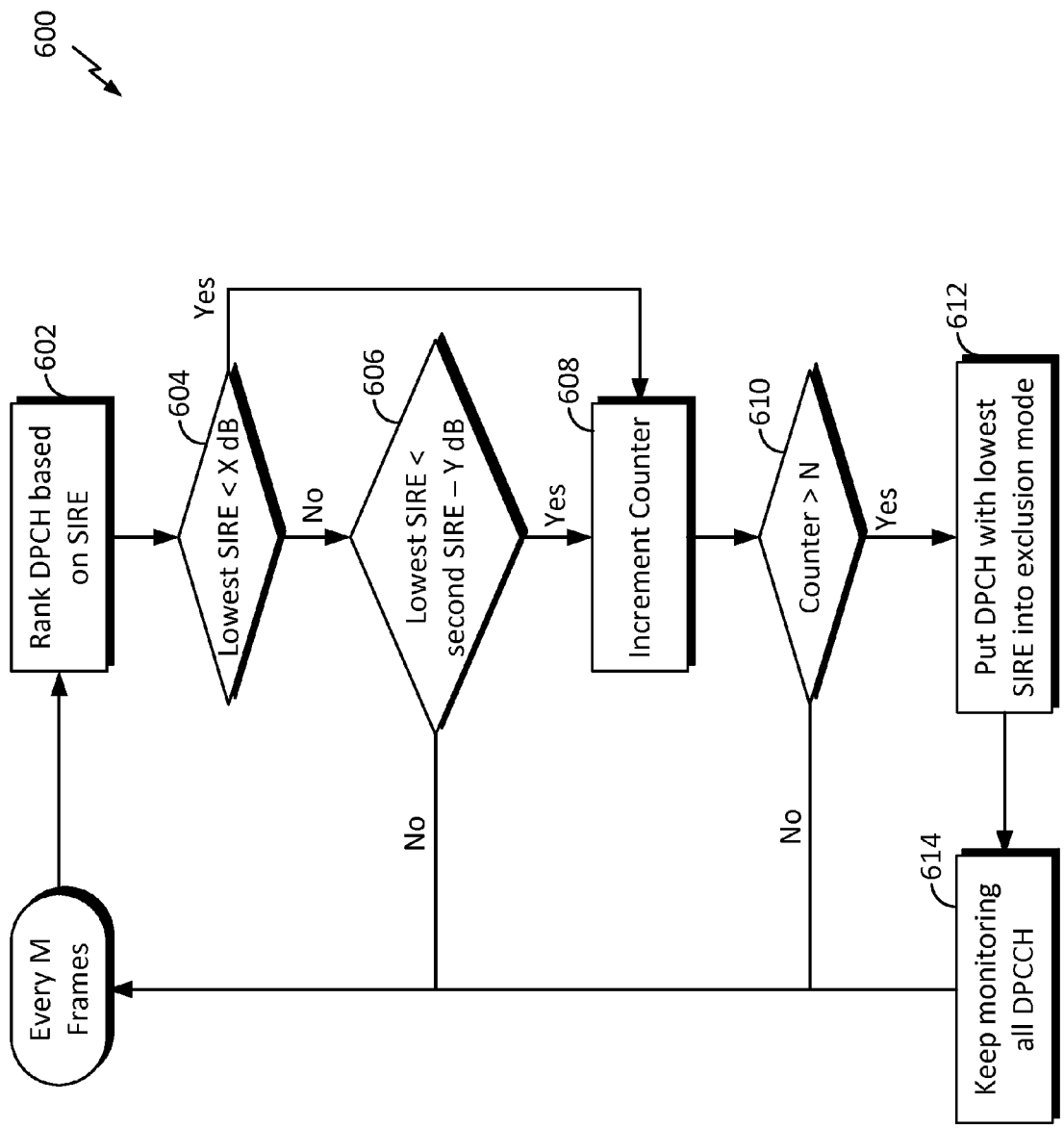
FIG. 6 is a flowchart illustrating a procedure for handling an excluded spurious DPCH in accordance with an aspect of the disclosure.

FIG. 6 is a flowchart illustrating a procedure 600 for handling a spurious DPCH of a cell in an active set in accordance with an aspect of the disclosure. The procedure 600 may be performed by any of the UEs illustrated in FIGS. 1 and 2, which may be implemented as the apparatus 800 illustrated in FIGS. 8 and 9. In other aspects of the disclosure, the procedure 600 may be performed by any suitable device or UE. For every M frames (e.g., M is equal to or less than 4), at block 602, a UE ranks the cells of the DPCHs (or the DPCHs) in an active set based on SIRE. The UE may calculate the SIRE for each DPCH during each frame or once every few frames. For wireless systems, the SIRE is an important metric of communication link quality and may be used in various control actions for optimal allocation of radio resources. In an aspect of the disclosure, the functions of the block 602 may correspond to the block 502 of FIG. 5.

At block 604, if the lowest SIRE of the DPCHs is less than a first predetermined value or threshold (e.g., X dB), the procedure 600 continues to block 608; otherwise, it continues to block 606. At block 606, if the lowest SIRE is less than the second lowest SIRE of the DPCHs by more than a second predetermined value or threshold (e.g., Y dB), the procedure 600 continues to block 608. Therefore, if the lowest SIRE is less than the first predetermined value, or the second lowest SIRE by more than the second predetermined value, the UE increments a counter at block 608.

In various aspects of the disclosure, if the lowest SIRE is not less than the first predetermined value and not less than the second lowest SIRE by more than the second predetermined value, the counter may be reset or decremented. At block 610, the procedure 600 proceeds to block 612 if the value of the counter is greater than a third predetermined value (e.g., N, an integer value). The first, second and third predetermined values can be any suitable values. In an aspect of the disclosure, the functions performed in blocks 604, 606, 608, and 610 may be performed at block 504 of FIG. 5.

At block 612, the DPCH with the lowest SIRE is considered a spurious DPCH, and the UE puts this DPCH with the lowest SIRE into an exclusion mode. In various aspects of the disclosure, more than one DPCH of one or more cells in an active set may be identified as a spurious DPCH by performing the procedure 600 repeatedly. Although the cell(s) of the detected one or more spurious DPCHs are kept in the active set, the UE excludes these spurious DPCHs from both Dedicated Physical Data Channel (DPDCH) decoding and overall SIRE calculation. This is in effect equivalent to removing the cell of a spurious DPCH from the active set at the UE internally. The network, however, may not be aware of the fact that the UE is excluding the cell of a spurious DPCH in the active set. However, the UE still monitors the Dedicated Physical Control Channel (DPCCH) of each DPCH of each cell in the active set including the spurious DPCH in the exclusion mode (see block 614). In this way, the spurious DPCH may be excluded, for example, from channel decoding and overall SIRE calculation, and can be later added back (removed from exclusion mode) if its SIRE improves. For example, the excluded PDCH no longer has the lowest SIRE or fails to meet the conditions of blocks 604 and 606. In an aspect of the disclosure, the functions of blocks 612 and 614 may be performed in block 506 of FIG. 5.

In an aspect of the disclosure, for a spurious DPCH of a cell that has been put into the exclusion mode, the UE still keep monitoring the DPCCH of the spurious DPCH to calculate the SIRE every M frames (e.g., M is equal to or less than 4). If the SIRE of this particular DPCH is not the lowest among all DPCHs in the active set cells for a certain consecutive number of times, the UE can remove this DPCH from the exclusion mode. That means the UE can again utilize and include this DPCH into soft combining for decoding the channels from the cells.

Figure 7:
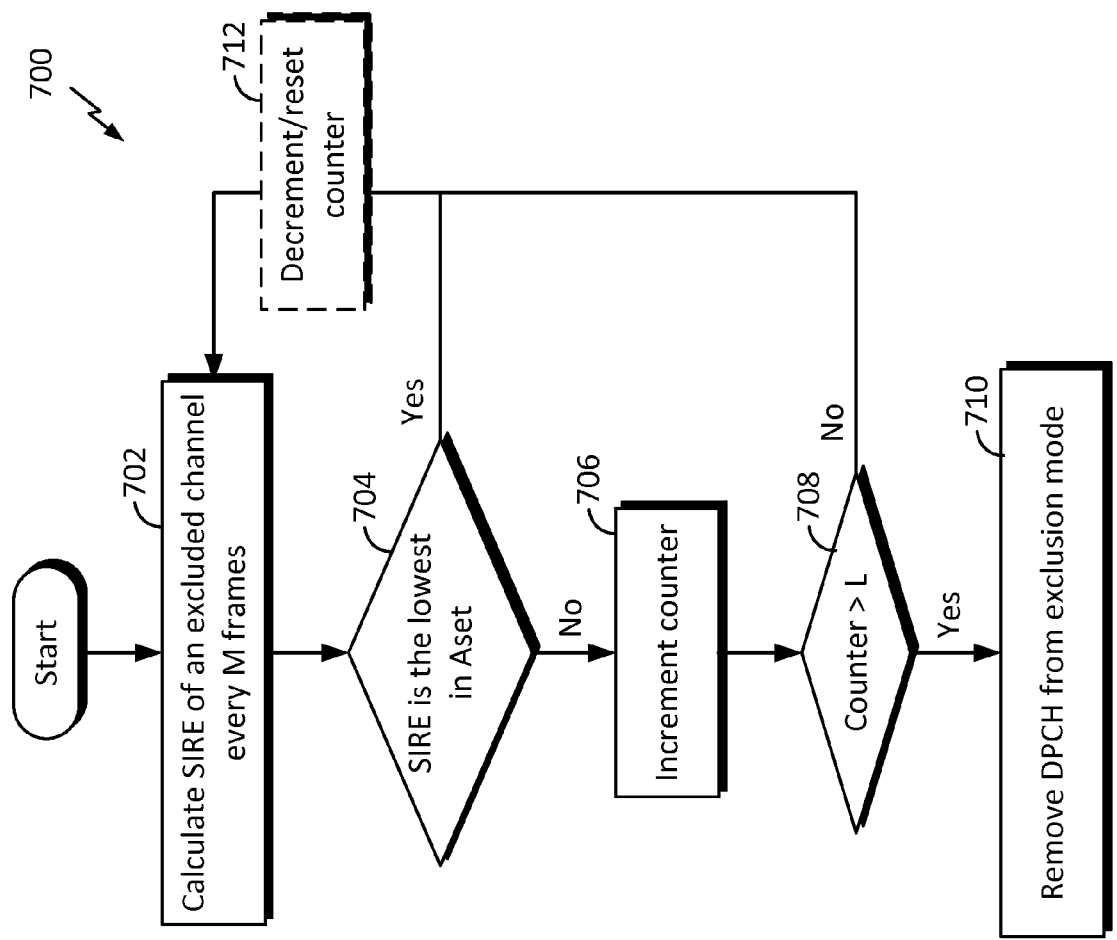
FIG. 7 is a flowchart illustrating a procedure for handling an excluded spurious DPCH in accordance with another aspect of the disclosure.

FIG. 7 is a flowchart illustrating a procedure 700 for handling an excluded spurious DPCH in accordance with an aspect of the disclosure. The procedure 700 may be performed by any of the UEs illustrated in FIGS. 1 and 2, which may be implemented as the apparatus 800 illustrated in FIGS. 8 and 9. At block 702, the UE calculates the SIRE of an excluded spurious DPCH (an excluded channel) every M frames (e.g., M is equal to or less than 4). At block 704, if the SIRE of the excluded DPCH is not the lowest in the active set, the procedure 700 continues to block 706; otherwise, the procedure 700 returns to block 702. At block 706, if the SIRE of the excluded DPCH is not the lowest in the active set, the UE increments a counter. At block 708, if the counter is greater than a predetermined value L, the procedure 700 continues to block 710 in which the UE removes the excluded DPCH from the exclusion mode. Otherwise, the procedure 700 returns to block 702.

In some aspects of the disclosure, the counter may be reset or decremented in block 712 if the SIRE of the excluded DPCH is still the lowest among all the DPCHs in the active set. In an aspect of the disclosure, the procedure 700 may be used to manage a spurious channel excluded in the procedures 500 and 600 described above.

Figure 8:
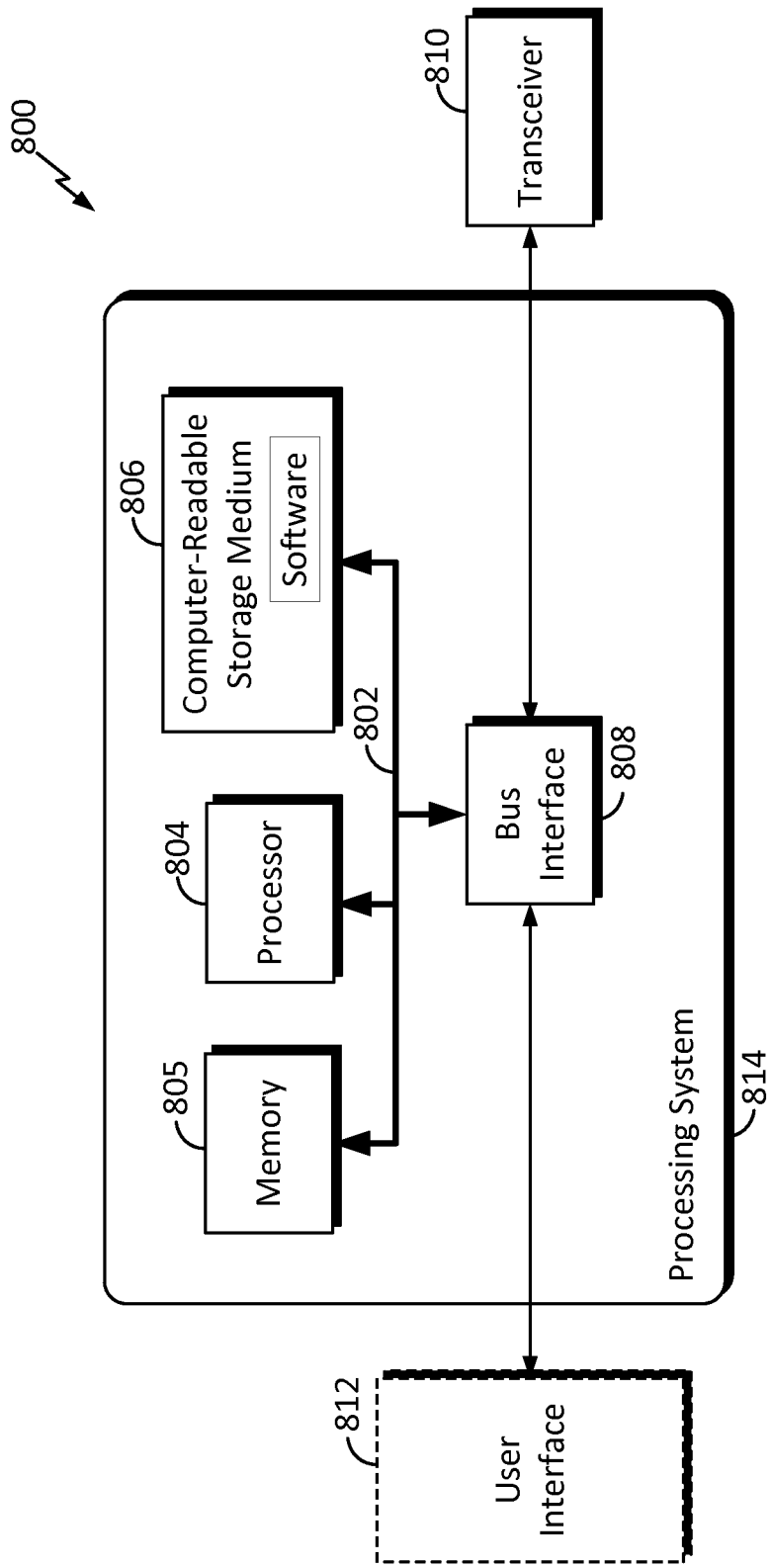
FIG. 8 is a block diagram illustrating an example of a hardware implementation for an apparatus employing a processing system in accordance with an aspect of the disclosure.

FIG. 8 is a conceptual diagram illustrating an example of a hardware implementation for an apparatus 800 employing a processing system 814. In accordance with various aspects of the disclosure, an element, or any portion of an element, or any combination of elements may be implemented with a processing system 814 that includes one or more processors 804. For example, the apparatus 800 may be a UE as illustrated in any one of FIGS. 1 and 2. In another example, the apparatus 800 may be a radio network controller (RNC) as illustrated in any one or more of FIGS. 1 and/or 2. Examples of processors 804 include various circuitries and components such as microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. That is, the processor 804, as utilized in an apparatus 800, may be used to implement any one or more of the processes and functions described and illustrated in FIGS. 5-7. In an aspect of the disclosure, the circuitries and components of the processors 804 may be hardware, software, firmware, or a combination thereof.

In this example, the processing system 814 may be implemented with a bus architecture, represented generally by the bus 802. The bus 802 may include any number of interconnecting buses and bridges depending on the specific application of the processing system 814 and the overall design constraints. The bus 802 links together various circuits including one or more processors (represented generally by the processor 804), a memory 805, and computer-readable media (represented generally by the computer-readable storage medium 806). The bus 802 may also link various other circuits such as timing sources, peripherals, voltage regulators, and power management circuits, which are well known in the art, and therefore, will not be described any further. A bus interface 808 provides an interface between the bus 802 and a transceiver 810. The transceiver 810 is a communication interface that provides a means for communicating with various other apparatus over a transmission medium. For example, the transceiver 810 may include a transmitter and a receiver that may be unitary or separate components. Depending upon the nature of the apparatus, a user interface 812 (e.g., keypad, display, speaker, microphone, joystick, touchpad, touchscreen) may also be provided.

The processor 804 is responsible for managing the bus 802 and general processing, including the execution of software stored on the computer-readable medium 806. The software, when executed by the processor 804, causes the processing system 814 to perform the various functions described in FIGS. 4-7 for any particular apparatus. The computer-readable medium 806 may also be used for storing data that is manipulated by the processor 804 when executing software.

Figure 9:
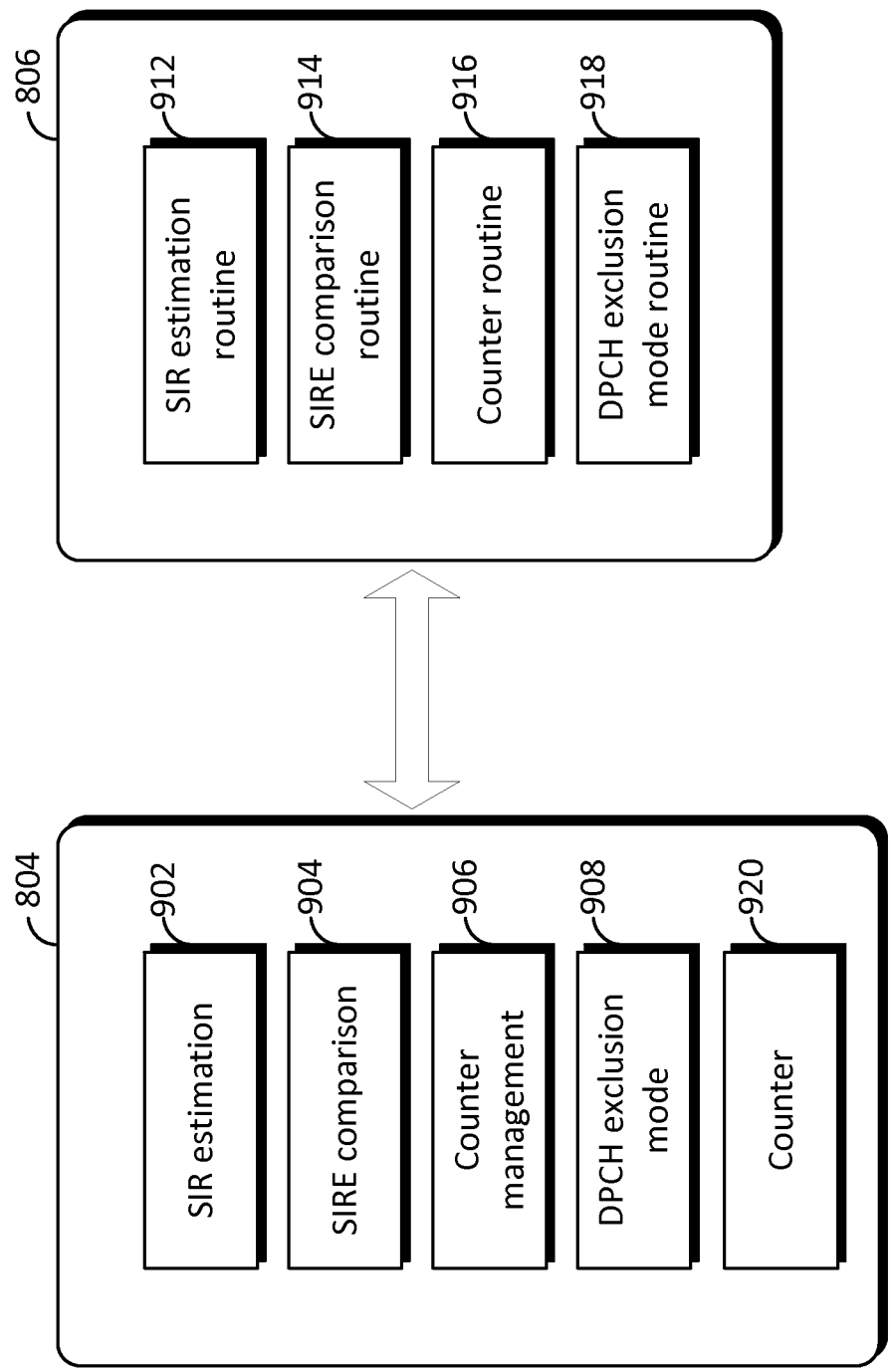
FIG. 9 is a block diagram illustrating a processor and a computer-readable medium of FIG. 8 in more detail in accordance with an aspect of the disclosure.

FIG. 9 is a conceptual diagram illustrating the processor 804 and computer-readable storage medium 806 in more detail in accordance with an aspect of the disclosure. The processor 804 may include a signal-to-interference (SIR) estimation component 902, an SIRE comparison component 904, counter management component 906, and DPCH exclusion mode component 908. The computer-readable storage medium 806 may include an SIR estimation routine 912, an SIRE comparison routine 914, a counter routine 916, and a DPCH exclusion mode routine 918. The processor 804 can execute the routines in the computer-readable storage medium 806 to configure the various components and circuitries shown in FIGS. 8 and 9 to perform different functions including those described in relation to FIGS. 4-7.

For example, the processor 804 may execute the SIR estimation routine 912 to configure the SIR estimation component 902 to determine the SIRE of each DPCH of each cell included in an active set. The processor 804 may execute the SIRE comparison routine 914 to configure the SIRE comparison component 904 to compare the SIREs and rank the DPCHs based on their SIRE. The processor 804 may execute the counter routine 916 to control and configure the counter management component 906. For example, the counter management component 906 can increment, decrement, or reset a counter 920 in accordance with the processes and procedures described in FIGS. 4-7. The processor 804 may execute the DPCH exclusion mode routine 918 to configure the DPCH exclusion mode component 908 to put or remove a DPCH (e.g., a spurious DPCH) into the exclusion mode based on its SIRE in accordance with the procedures described in FIGS. 4-7.

One or more processors 804 in the processing system may execute various software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 806. The computer-readable medium 806 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer.

The computer-readable medium 806 may reside in the processing system 814, external to the processing system 814, or distributed across multiple entities including the processing system 814. The computer-readable medium 806 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication operable at a user equipment, comprising:
during a first frame, determining a signal-to-interference ratio (SIR) for each channel of a plurality of channels associated with a plurality of cells maintained in an active set;
detecting a first channel of the plurality of channels as a spurious channel, wherein:
the SIR of the spurious channel is a lowest SIR among the plurality of channels and less than a first predetermined value; or
the SIR of the spurious channel is a lowest SIR among the plurality of channels and less than a second lowest SIR by more than a second predetermined value; and
during a second frame, putting the detected first channel in an exclusion mode in which the first channel is excluded from at least one of channel decoding or SIR calculation of the plurality of channels, while maintaining the cell associated with the first channel in the active set.

2. The method of claim 1, wherein the plurality of channels comprise a plurality of Dedicated Physical Channels (DPCHs).

3. The method of claim 1, wherein the SIR calculation comprises an SIR calculation of a Dedicated Physical Channel (DPCH) for each of the cells maintained in the active set.

4. The method of claim 1, further comprising:
if the SIR of the first channel is less than a first predetermined value, incrementing a counter; and
if the SIR of the first channel is not less than a first predetermined value but is less than a second lowest SIR of the plurality of channels by a second predetermined value, incrementing the counter, and
if a value of the counter is greater than a third predetermined value, putting the first channel in the exclusion mode.

5. The method of claim 1, further comprising:
if, in the exclusion mode, the first channel has an SIR that is not the lowest SIR among the plurality of channels, incrementing a counter; and
if a value of the counter is greater than a predetermined value, removing the first channel from the exclusion mode, thereby utilizing the first channel in channel decoding and SIR calculation of the plurality of channels.

6. The method of claim 1, further comprising monitoring the plurality of channels including the first channel in the exclusion mode.

7. The method of claim 1, further comprising, for detecting the first channel, detecting the first channel at least once every M frames, wherein M is equal to or less than 4.

8. An apparatus for wireless communication, comprising:
means for, during a first frame, determining a signal-to-interference ratio (SIR) for each channel of a plurality of channels associated with a plurality of cells maintained in an active set;
means for detecting a first channel of the plurality of channels as a spurious channel, wherein:
the SIR of the spurious channel is a lowest SIR among the plurality of channels and less than a first predetermined value; or
the SIR of the spurious channel is a lowest SIR among the plurality of channels and less than a second lowest SIR by more than a second predetermined value; and
means for, during a second frame, putting the detected first channel in an exclusion mode in which the first channel is excluded from at least one of channel decoding or SIR calculation of the plurality of channels, while maintaining the cell associated with the first channel in the active set.

9. The apparatus of claim 8, wherein the plurality of channels comprise a plurality of Dedicated Physical Channels (DPCHs).

10. The apparatus of claim 8, wherein the SIR calculation comprises an SIR calculation of a Dedicated Physical Channel (DPCH) for each of the cells maintained in the active set.

11. The apparatus of claim 8, wherein the means for putting the first channel in the exclusion mode is further configured to:
if the SIR of the first channel is less than a first predetermined value, increment a counter;
if the SIR of the first channel is not less than the first predetermined value but is less than a second lowest SIR of the plurality of channels by a second predetermined value, increment the counter; and
if a value of the counter is greater than a third predetermined value, putting the first channel in the exclusion mode.

12. The apparatus of claim 8, further comprising:
if, in the exclusion mode, the first channel has an SIR that is not the lowest SIR among the plurality of channels, means for incrementing a counter; and
if a value of the counter is greater than a predetermined value, means for removing the first channel from the exclusion mode, thereby utilizing the first channel in channel decoding and SIR calculation of the plurality of channels.

13. The apparatus of claim 8, further comprising means for monitoring the plurality of channels including the first channel in the exclusion mode.

14. The apparatus of claim 8, wherein the means for detecting the first channel is configured to detect the first channel at least once every M frames, wherein M is equal to or less than 4.

15. A non-transitory computer-readable storage medium comprising code for causing a user equipment (UE) to:
during a first frame, determine a signal-to-interference ratio (SIR) for each channel of a plurality of channels associated with a plurality of cells maintained in an active set;
detect a first channel of the plurality of channels as a spurious channel, wherein:
the SIR of the spurious channel is a lowest SIR among the plurality of channels and less than a first predetermined value; or
the SIR of the spurious channel is a lowest SIR among the plurality of channels and less than a second lowest SIR by more than a second predetermined value; and
during a second frame, putting the detected first channel in an exclusion mode in which the first channel is excluded from at least one of channel decoding or SIR calculation of the plurality of channels, while maintaining the cell associated with the first channel in the active set.

16. The non-transitory computer-readable storage medium of claim 15, wherein the plurality of channels comprise a plurality of Dedicated Physical Channels (DPCHs).

17. The non-transitory computer-readable storage medium of claim 15, wherein the SIR calculation comprises an SIR calculation of a Dedicated Physical Channel (DPCH) for each of the cells maintained in the active set.

18. The non-transitory computer-readable storage medium of claim 15, wherein the code for putting the first channel in the exclusion mode further comprises code for causing the UE to:
   if the SIR of the first channel is less than a first predetermined value, increment a counter;
   if the SIR of the first channel is not less than the first predetermined value but is less than a second lowest SIRE of the plurality of channels by a second predetermined value, increment the counter; and
   if a value of the counter is greater than a third predetermined value, putting the first channel in the exclusion mode.

19. The non-transitory computer-readable storage medium of claim 15, further comprising code for causing the UE to:
   if, in the exclusion mode, the first channel has an SIR that is not the lowest SIR among the plurality of channels, increment a counter; and
   if a value of the counter is greater than a predetermined value, remove the first channel from the exclusion mode, thereby utilizing the first channel in channel decoding and SIR calculation of the plurality of channels.

20. The non-transitory computer-readable storage medium of claim 15, further comprising code for causing the UE to monitor the plurality of channels including the first channel in the exclusion mode.

21. The non-transitory computer-readable storage medium of claim 15, further comprising code for causing the UE to detect the first channel at least once every M frames, wherein M is equal to or less than 4.

22. An apparatus for wireless communication, comprising:
   at least one processor;
   a communication interface coupled to the at least one processor; and
   a memory coupled to the at least one processor,
   wherein the at least one processor comprises:
      a first component configured to, during a first frame, determine a signal-to-interference ratio (SIR) for each channel of a plurality of channels associated with a plurality of cells maintained in an active set;
      a second component configured to detect a first channel of the plurality of channels as a spurious channel, wherein:
         the SIR of the spurious channel is a lowest SIR among the plurality of channels and less than a first predetermined value; or
         the SIR of the spurious channel is a lowest SIR among the plurality of channels and less than a second lowest SIR by more than a second predetermined value; and
      a third component configured to, during a second frame, put the detected first channel in an exclusion mode in which the first channel is excluded from at least one of channel decoding or SIR calculation of the plurality of channels, while maintaining the cell associated with the first channel in the active set.

23. The apparatus of claim 22, wherein the plurality of channels comprise a plurality of Dedicated Physical Channels (DPCHs).

24. The apparatus of claim 22, wherein the SIR calculation comprises an SIR calculation of a Dedicated Physical Channel (DPCH) for each of the cells maintained in the active set.

25. The apparatus of claim 22, wherein the third component is further configured to:
   if the SIR of the first channel is less than a first predetermined value, increment a counter;
   if the SIR of the first channel is not less than the first predetermined value but is less than a second lowest SIR of the plurality of channels by a second predetermined value, increment the counter; and
   if a value of the counter is greater than a third predetermined value, put the first channel in the exclusion mode.

26. The apparatus of claim 22, wherein the third component is further configured to:
   if, in the exclusion mode, the first channel has an SIR that is not the lowest SIR among the plurality of channels, increment a counter; and
   if a value of the counter is greater than a predetermined value, remove the first channel from the exclusion mode, thereby utilizing the first channel in channel decoding and SIR calculation of the plurality of channels.

27. The apparatus of claim 22, wherein the first component is further configured to monitor the plurality of channels including the first channel in the exclusion mode.

28. The apparatus of claim 22, further the first component is further configured to detect the first channel at least once every M frames, wherein M is equal to or less than 4.

* * * * *